US009895655B2

(12) United States Patent
Sinstedten et al.

(10) Patent No.: US 9,895,655 B2
(45) Date of Patent: Feb. 20, 2018

(54) HOUSING HEAD WITH SCAVENGING AIR REGULATOR

(71) Applicant: BEKO TECHNOLOGIES GMBH, Neuss (DE)

(72) Inventors: Johannes Sinstedten, Korschenbroich (DE); Thomas Prior, Odenthal (DE); Jörg Rambow, Neuss (DE)

(73) Assignee: BEKO TECHNOLOGIES GMBH, Neuss (DE)

( * ) Notice: Subject to any disclaimer, the term of this patent is extended or adjusted under 35 U.S.C. 154(b) by 0 days.

(21) Appl. No.: 15/129,323

(22) PCT Filed: Dec. 22, 2014

(86) PCT No.: PCT/EP2014/078967
§ 371 (c)(1),
(2) Date: Sep. 26, 2016

(87) PCT Pub. No.: WO2015/144270
PCT Pub. Date: Oct. 1, 2015

(65) Prior Publication Data
US 2017/0113181 A1   Apr. 27, 2017

(30) Foreign Application Priority Data

Mar. 28, 2014 (DE) .......... 10 2014 104 386

(51) Int. Cl.
*B01D 53/22* (2006.01)
*B01D 53/26* (2006.01)

(52) U.S. Cl.
CPC ...... *B01D 53/268* (2013.01); *B01D 2053/224* (2013.01)

(58) Field of Classification Search
CPC ........... B01D 53/268; B01D 2053/224; B01D 53/26; B01D 53/22; B01D 2201/162; B01D 2311/13; B01D 2201/16
See application file for complete search history.

(56) References Cited

U.S. PATENT DOCUMENTS 5,160,514 A    11/1992 Newbold et al.
5,176,725 A *   1/1993 Puri ........................ B01D 53/22
                                                    210/321.81
(Continued)

FOREIGN PATENT DOCUMENTS

EP    0903173 A2   3/1999
JP    0957043 A    3/1997
(Continued)

OTHER PUBLICATIONS

International Search Report dated Mar. 31, 2015 re: Application No. PCT/EP2014/078967; pp. 1-3; citing: US 2002/162455 A1, JP 2001 219026 A, JP H09 57043 A, JP H11 33338 A, US 2003/047077 A1, JP 2001 205033 A and EP 0 903 173 A2.

*Primary Examiner* — Anthony Shumate
(74) *Attorney, Agent, or Firm* — Cantor Colburn LLP

(57) ABSTRACT

A drying apparatus housing head for compressed air is connected to a housing wherein a diaphragm filter includes an inlet for humid compressed air and an outlet for dried compressed air. The inlet transitions into an inner pipe surrounded by a housing section. The outlet transitions into a ring-shaped chamber formed between an outer side of the inner pipe and an inner side of the housing. A valve ring guide of a main body surrounds the inner pipe and is held immovably, and a ring-shaped rolling diaphragm is arranged in the chamber, held at the outer side thereof and connected at the inner side thereof to a valve ring which surrounds the valve ring guide and moves along a longitudinal axis. The valve ring guide has a duct through which dry compressed (Continued)

air is conducted in the direction of the diaphragm filter and is closed off by the valve ring.

9 Claims, 11 Drawing Sheets

(56) References Cited

U.S. PATENT DOCUMENTS

| | | | | |
|---|---|---|---|---|
| 6,128,825 | A * | 10/2000 | Cunkelman | B01D 53/268 34/79 |
| 8,821,614 | B1 * | 9/2014 | Albenze | B01D 53/22 73/37 |
| 2002/0162455 | A1 | 11/2002 | Bikson et al. | |
| 2003/0047077 | A1 | 3/2003 | Giglia et al. | |
| 2007/0277673 | A1 * | 12/2007 | Crowder | B01D 53/268 95/52 |
| 2008/0006578 | A1 * | 1/2008 | Sims | G01N 30/28 210/639 |
| 2008/0060517 | A1 * | 3/2008 | Nichols | B01D 53/22 95/45 |
| 2008/0087167 | A1 * | 4/2008 | Wright | B01D 53/22 96/4 |
| 2008/0178735 | A1 * | 7/2008 | Barnette | B01D 53/22 95/45 |
| 2008/0223212 | A1 * | 9/2008 | Crowder | B01D 53/22 95/52 |
| 2008/0257154 | A1 * | 10/2008 | Wright | B01D 53/22 96/4 |
| 2008/0263892 | A1 * | 10/2008 | Nichols | B01D 53/268 34/419 |
| 2009/0049983 | A1 * | 2/2009 | Thelen | B01D 53/268 95/10 |
| 2011/0260112 | A1 * | 10/2011 | Wijmans | B01D 53/22 252/372 |
| 2015/0165370 | A1 * | 6/2015 | Peake | B01D 53/229 96/7 |

FOREIGN PATENT DOCUMENTS

| | | |
|---|---|---|
| JP | 1133338 A | 2/1999 |
| JP | 2001205033 A | 7/2001 |
| JP | 2001219026 A | 8/2001 |

* cited by examiner (Prior Art)

HOUSING HEAD WITH SCAVENGING AIR REGULATOR

TECHNICAL FIELD

The disclosure relates to a housing head for a drying apparatus for compressed air, which housing head can be connected to a housing in which a diaphragm filter, preferably a bundle of hollow fibre diaphragms, is arranged.

BACKGROUND

The use of compressed air, for example in industrial engineering or medical engineering, is always connected with a quality problem as regards humidity in the pipe network and at the points of consumption. An important requirement therefore consists in drying the compressed air. To this end diaphragm filters are used, which are selectively permeable to water vapour. The filter housing has a bundle of highly-selective hollow fibre diaphragms arranged in it, through which humid compressed air flows. The humid compressed air is preferably filtered in order to trap remaining dirt particles, oil mist and condensate which could block the hollow fibre diaphragms. The hollow fibre diaphragms allow the water vapour to diffuse to the outside. At the outlet for dried compressed air a small partial current of the compressed air is branched off and used as sweep gas after expansion. The sweep gas is passed across the outside of the hollow fibres in a counter-current to the compressed air. Due to the difference in water vapour concentration a continuous migration of water molecules from the compressed air into the sweep gas is achieved. Thus the commonly used term "diaphragm filter" can be at least misunderstood insofar as a diaphragm filter does not perform separation mechanically but by diffusion. For simplicity's sake this expression is nevertheless used in terms of the disclosure.

This process is continuous. The sweep gas constantly dries the entering humid compressed air. Only water molecules can penetrate through the diaphragms of the hollow fibres. The composition of the dried compressed air remains unchanged. As a result pure, dry compressed air is obtained.

The volume of the sweep gas current is defined by a nozzle which allows a constant volume current defined by pressure and size of nozzle to pass through. The disadvantage is that in case of a partial load or zero load, when there is little or no demand for compressed air, the sweep gas current remains constant although it is not at all needed or needed only to a limited extent. This leads to considerable pressure losses in the overall system.

In order to alleviate this problem, conventional sweep gas regulators adapt the sweep gas current to the required quantity.

U.S. Pat. No. 5,160,514 has disclosed a drying apparatus for compressed air with such a sweep gas regulator, which is integrated with a drying apparatus for compressed air. To this end the compressed air outlet of the drying apparatus is in communication with a chamber, which is limited by a diaphragm. On the other side of the diaphragm there is a further chamber, which is connected via a line to the compressed air inlet of the drying apparatus. The diaphragm assumes a position which depends on the pressure difference between compressed air inlet and compressed air outlet. The diaphragm is connected to a valve element which comprises a lateral slot and is guided in an associated inner bore of the housing. Depending on the position of the diaphragm the valve element assumes a position, which allows a current of compressed air to flow more or less strongly from the compressed air outlet of the drying apparatus in direction of the sweeping line.

This sweep gas regulator does not function in as satisfactory manner. In particular when there are small pressure differences between inlet pressure und outlet pressure for the compressed air of the drying apparatus, regulating behaviour is not satisfactory. Further when there are large pressure differences between inlet pressure und outlet pressure of the compressed air of the drying apparatus there exists the problem that the air at the compressed air outlet must on the one hand supply pressure and on the other hand must flow. A disadvantage with this solution is that regulation must be adjusted to supply a concrete (average) operating pressure. If operating pressure fluctuates regulating behaviour changes distinctly. This leads to conditions, which are confusing.

Another factor is that the differential pressure is also dependent on the filter element load, the degree of filling impacts on the differential pressure and thus on the regulation of the sweep gas. This can change during the useful life of the filter element, which is undesirable.

SUMMARY

Starting from this basis it has become the requirement of the disclosure to propose a housing head for a drying apparatus for compressed air, which permits improved regulation of the sweep gas. It shall be possible to react quickly and sensitively to different demands for compressed air, but the housing head shall be nevertheless constructed in a robust and resilient manner.

According to the disclosure, this requirement is met by a housing head with the characteristics of patent claim 1.

Essentially, the disclosure proceeds along two paths: on the one hand it is proposed to control the compressed air current which is diverted to the sweep gas inlet, in such a way that sweep gas is indeed available only when compressed air is drawn by a compressed-air driven apparatus. During work pauses when the compressed-air driven apparatus is not used, the sweep gas current is switched off or at least reduced to a level at which distinctly less compressed air is consumed for dehumidification. However, regulation can also be performed as a function of the drawn compressed air current in that a greater or a lesser amount of sweep gas is made available depending on whether a greater or a lesser amount of compressed air is drawn for a downstream compressed-air driven apparatus.

If compressed air is drawn pressure on the outflow side reduces, which has the effect of the valve ring moving along the basic body and thereby opening the flow transfer duct as well as the sweep gas duct.

An essential advantage of the housing head/sweep gas regulator according to the disclosure consists in the fact that the sweep gas switch only starts working and switching as from a certain level of differential pressures. When pressure drops in the exit area the force equilibrium at the diaphragm is impacted and the higher force below the diaphragm starts to lift the same. Both sides of the switch across which the differential pressure results, are situated at the exit of the system, which means that the sweep gas switch is independent of the differential pressure in the system. The valve ring opens the openings of the sweep gas duct and the flow transfer duct directly and in dependence of the pressure acting upon the rolling diaphragm. This allows a very sensitive reaction to changes in pressure to be achieved, opening happens quickly and directly.

In the initial position, i.e. when there is no demand for compressed air, the ring-shaped chamber between the outer side of the inner pipe and the inner side of the outer wall of the housing section is closed by the rolling diaphragm.

In this position the rolling diaphragm is held on the outer side and cannot be moved on the outer side along a longitudinal axis of the inner pipe and the surrounding coaxial housing section. By contrast the valve ring, which is connected to the rolling diaphragm on its inner side, is resting on a floor surface of the basic body and can be shifted by compressed air acting on the inflow side of the rolling diaphragm along the longitudinal axis of a valve ring guide/the straight section of the inner pipe. Due to the movement of the valve ring, the flow transfer duct and the sweep gas duct are opened so that on the one hand dried compressed air can flow out through the outlet, and on the other sweep gas is conducted back via a sweep gas duct outside across the hollow fibres contrary to the flow direction of the humid compressed air inside the hollow fibres and can flow back contrary to the flow direction of the dry air at the diaphragm filter.

Thus, the valve ring, which due to the compressed air movement/the differential pressure lifts off or moves, opens two flow paths, one flow path for the dry air to the outlet and one flow path for dry air which is to be used as sweep gas.

With a particularly advantageous variant of the embodiment the basic body, when fitted in its transverse direction extending transversely to the longitudinal direction, also occupies the entire ring-shaped chamber between the outer side of the inner pipe and the inside of the outer wall. In flow direction of the dried compressed air the basic body is arranged in front of the annular diaphragm and shaped as a pot. In its floor surface the basic body comprises respective through-openings, through which the compressed air is directed against the inflow side of the rolling diaphragm.

In its initial position the valve ring lies within the pot-like basic body spanning the rolling diaphragm with a valve ring lower part and a valve ring upper part. On the opposite side seen in transverse direction the rolling diaphragm is held on the basic body with the aid of a clamping ring. The diameter of the clamping ring is chosen such that the same rests against the inside of the outer wall of the housing section.

The essential advantage of a basic body with a valve ring configured in this way consists in that this can be fitted into the housing head as a cohesive functional unit. To this end the basic body is sealed against the inside of the outer wall of the housing section via a gasket.

Advantageously, the valve ring is held via a spring element in its initial position so that it is driven back into its initial position when there is no demand for compressed air from a consumer.

The spring element used may be a screw spring, which is arranged between the valve ring and a support surface inside the housing head. The spring element inside the housing head rests on a valve ring so that this is pressed via the support surface against the flow direction into its initial position. When compressed air is drawn the compressed air overcomes the spring force and moves the valve ring. Instead of a screw spring other suitable spring elements may be used, not only compression but also tension springs.

In its initial position, the valve ring lies in front of an inlet opening of the sweep gas duct, the first section of which extends essentially transversely to the longitudinal axis of the inner pipe. A second section of the sweep gas duct joined thereto extends in parallel to the inner pipe and transitions into a third section, which again extends transversely to the longitudinal axis of the inner pipe. The dry air is passed through the sweep gas duct further into the area on the outside around the hollow fibres. According to the disclosure merely one sweep gas duct may be provided, but a number of sweep gas ducts evenly distributed around the inner pipe may also be meaningful.

The at least one flow transfer duct is formed in the basic body by a groove extending along the longitudinal axis of the inner pipe and advantageously deepening in a direction pointing away from the rolling diaphragm. Due to the increasing deepening the diameter of the open flow transfer duct continually increases as the valve ring is moving, thereby avoiding a sudden rise in flow transfer cross-section. A hopefully constant increase in flow transfer cross-section has the effect of causing the diaphragm to perform smooth movements without fluttering. Advantageously the grooves may be configured in such a way that they free a narrow flow cross-section as early as in the initial position in order to avoid a sudden opening and thus fluttering.

In principle, a number of different embodiments of the flow transfer duct are possible. For example, the valve ring guide may have just one single groove provided in it, preferably however, a number of grooves are present which are evenly distributed across the outer circumference of the inner pipe. Alternatively instead of individual flow transfer ducts, provision may also be made for the entire valve ring guide to continuously taper so that there is no need for individual grooves. In the initial position the valve ring then rests against an area where the diameter of the valve ring guide is at its maximum. When the valve ring moves, then due to the tapering an overflowing of compressed air becomes automatically possible. In order to ensure a uniform movement of the valve ring, guide elements such as ribs should be provided along the longitudinal axis of the inner pipe on the outside thereof, which prevent the valve ring from tilting.

The inflow surface of the rolling diaphragm is relatively large and makes it possible to use a relatively strong spring element, which in turn distinctly improves reproducibility of the switching point. In addition, due to the increased positioning force, resistance against mechanical influences is stronger. Overall due to the compact construction the amount of input material needed is small.

With a particularly advantageous variant of the embodiment the valve ring and the basic body are configured in such a way that in the initial position, when no compressed air is drawn, a minimum sneak air current can be returned into the sweep gas duct. Preferably the valve ring, in the area where it rests against the sweep gas duct, comprises a small through-passage, through which sneak air is permanently directed into the sweep gas duct. This sneak air also serves to control the compressed air system.

The basic body of the valve ring may be arranged on an inner pipe which is to be completely assigned to the housing head. Alternatively it is possible according to the disclosure that a free end of the inner pipe and a free end of a core pipe protrude into the basic body/the valve ring guide. The core pipe is to be assigned to the diaphragm filter element which is arranged inside the housing to which the housing head can be connected. Thus the basic body also serves as a connecting part between the housing head and the diaphragm filter element connected therewith.

The inner pipe is sealed on its outside via gaskets against the basic body. If the basic body surrounds both the inner pipe and the core pipe, the core pipe is also sealed via gaskets against the basic body.

In terms of the description of the disclosure, for simplicity's sake the term "sweep gas regulator" is used because depending on the implementation regulation of the sweep gas currents is possible with the aid of the device according to the disclosure even if in the main variants are described with which the sweep gas is merely controlled. The sweep gas duct, as already described, may be implemented as a simple bore, but according to the disclosure an elongated slot or a number of bores through which sweep gas is guided to a greater or lesser extent is also feasible.

Control behaviour is dependent on the design of the sweep gas diversion or the sweep gas duct and restoring forces, which act on the sweep gas switch. Thus control behaviour can be influenced by means of a restoring spring, wherein using an adjustable counter-bearing calibration is also possible according to the disclosure.

BRIEF DESCRIPTION OF THE DRAWINGS

The disclosure will now be explained in more detail with reference to the following figures. These are not to be understood as limiting the disclosure in any way, but represent merely schematic views of the state of the art and the disclosure, wherein.

DETAILED DESCRIPTION OF THE DRAWINGS

Figure 1:
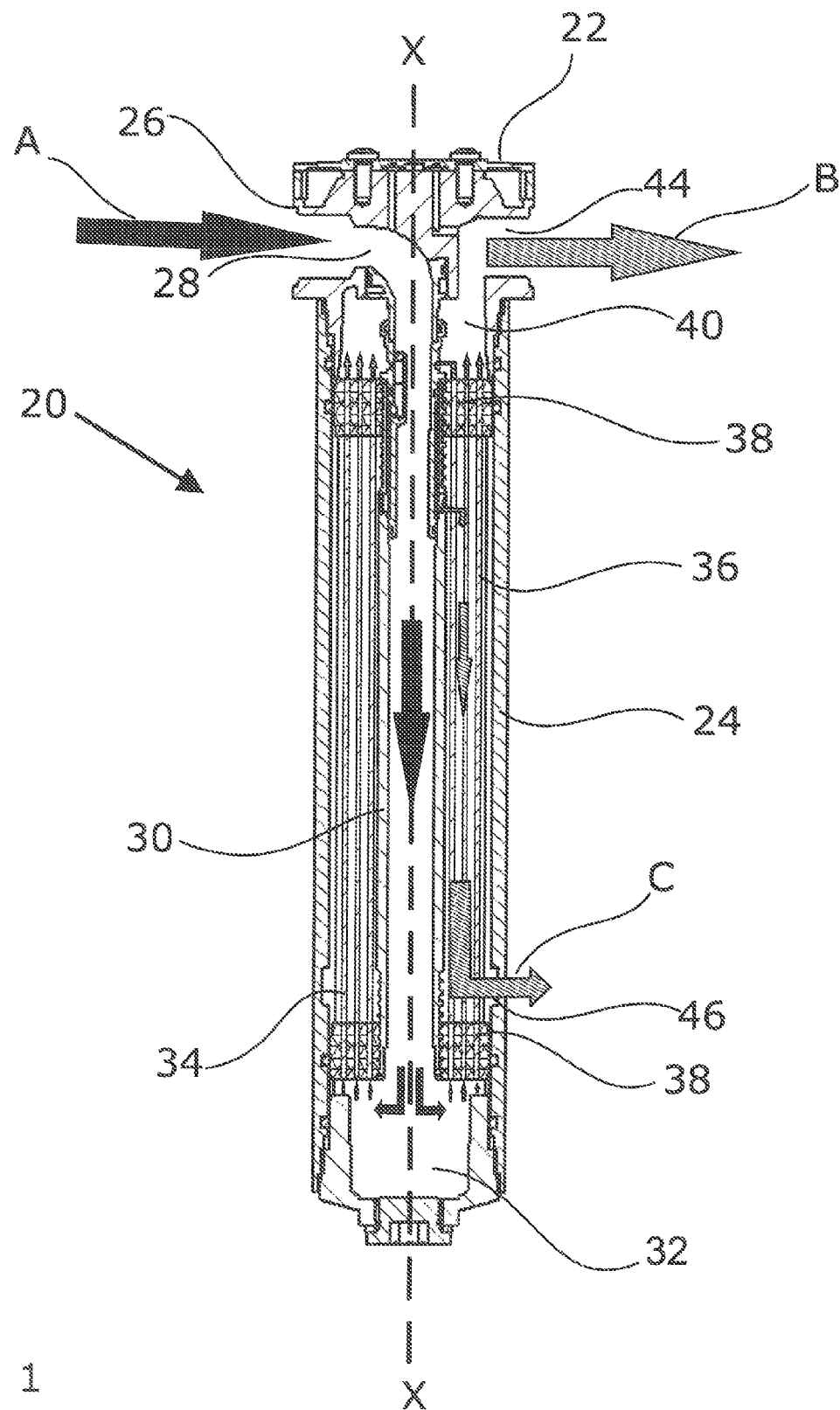
FIG. 1 shows a diaphragm dryer according to the state of the art in cross-section.
Figure 2:
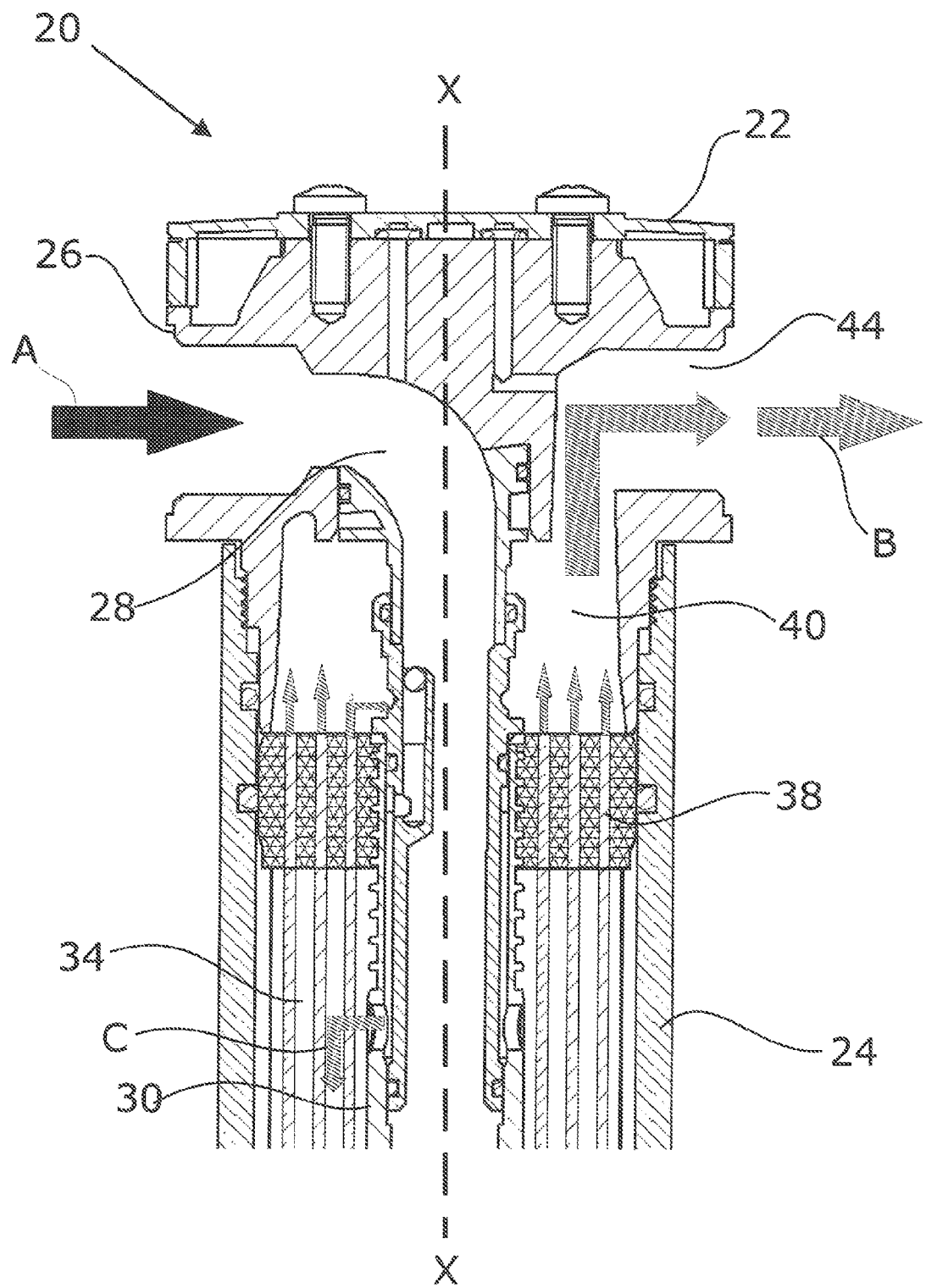
FIG. 2 shows an enlarged view of a housing head of a diaphragm dryer according to the state of the art in cross-section.

FIGS. 1 and 2 illustrate the function of the generic diaphragm dryer 20 according to the state of the art. This comprises a housing head 22, to which a housing 24 is screwed in a pressure-tight manner. The housing head 22 comprises an inlet 26, which transitions into an inner pipe 28. In the embodiment shown the inner pipe 28 comprises a bend of approx. 90° and transitions into a straight area, which extends along a longitudinal axis X-X.

To the inner pipe 28 is joined a core pipe 30, the length of which is shorter than the total length of the housing 24. To the free end of the core pipe 30 is therefore joined an exit chamber 32 within the housing 24, into which the compressed air exits from the core pipe 30 and is diverted into a housing annular space 34. The housing annular space 34 is situated between an outer wall of the core pipe 30 and an inner wall of the housing 24.

Hollow fibres 36 are arranged within the housing annular space 34, which comprise a porous carrier material with a coating, which is permeable to water vapour. The hollow fibres 36 in the example shown are held by holding elements 38. The holding elements 38 also direct the compressed air exclusively into the interior of the hollow fibres 36.

The housing annular space 34 transitions into a ring chamber 40 which essentially is arranged in the housing head 22. The ring chamber 40 is situated between the outer side of the inner pipe 28 and an inner side of a wall 42 of the housing head 22. To this ring chamber 40 is joined an outlet 44 in flow direction of the compressed air.

In FIGS. 1 and 2 and in part also in the following figures the fluid currents are marked by arrows, wherein humid compressed air is marked with A, dry compressed air is marked with B, sweep gas with C and sneak air with D. FIGS. 1 and 2 make it clear that the sweep gas current is permanently present, even if no useful air is drawn via the outlet 44 of the diaphragm dryer 20.

The arrows show the flow progression of the fluid in particular of compressed air within the diaphragm dryer 20. The compressed air is directed through the inlet 26 into the diaphragm dryer 20, travels through the inner pipe 28 and the core pipe 30 into the discharge chamber 32 and from there flows back through the housing annular space 34 through the hollow fibres 36 to the housing head 22 and through the outlet 44 back out. While travelling through the hollow fibres 36 the humidity of the compressed air diffuses through the hollow fibre walls to outside.

A partial current of the dried compressed air is diverted relatively shortly before the outlet 44 and directed as sweep gas into the outer space of the hollow fibres, where it absorbs the diffused water vapour and then discharges this through a sweep gas outlet 46 into the environment.

The holding elements 38 for the hollow fibres 36 are constructed in such a way that compressed air can only flow through the interior of the hollow fibres 36. Therefore there is merely sweep gas C in the outer space between the hollow fibres 36.

Figure 3:
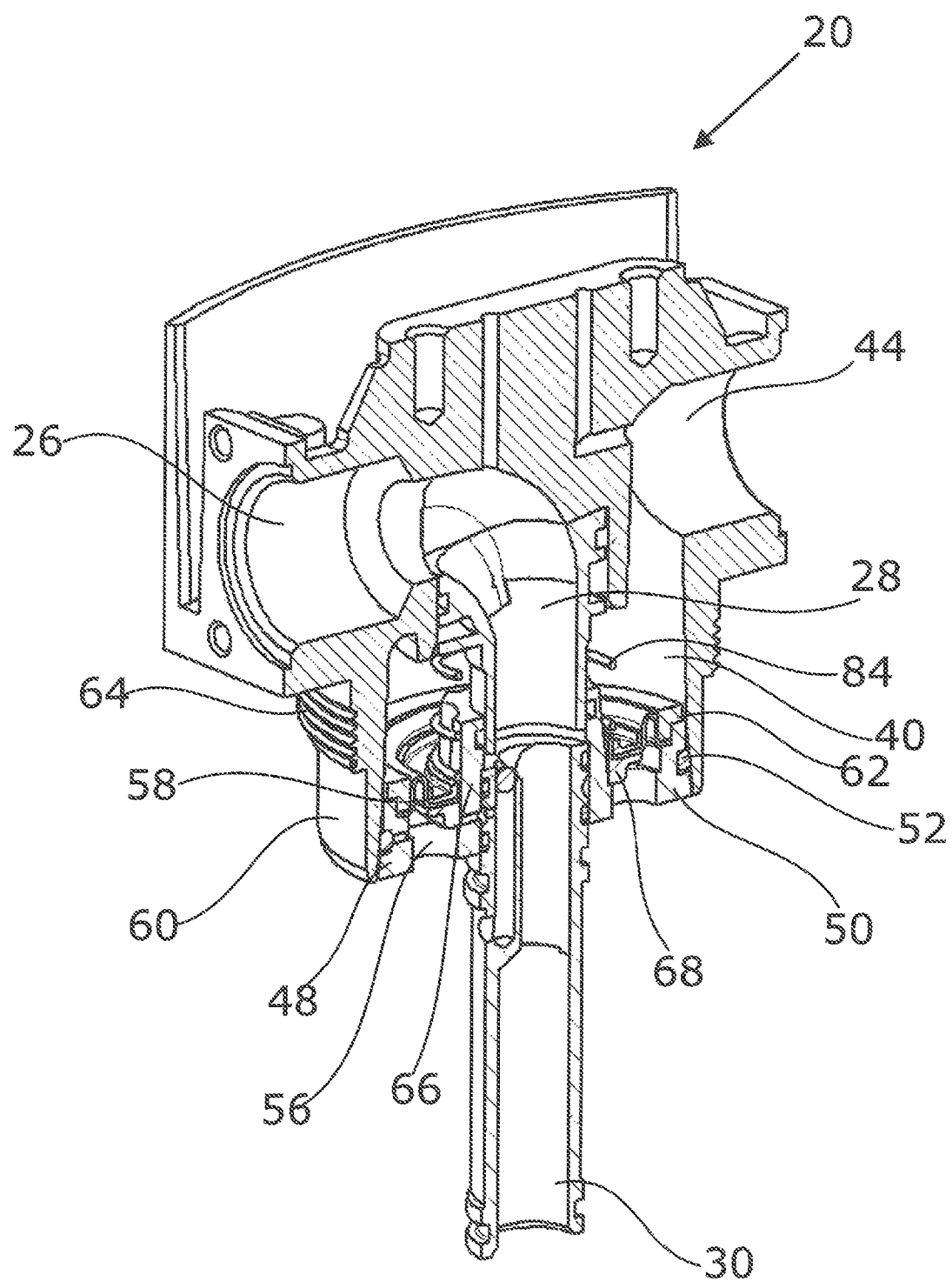
FIG. 3 shows a perspective view of a housing head according to the disclosure in cross-section.

FIG. 3, in the first sectional diagram, shows a housing head 22 according to the disclosure with a sweep gas switch 48. The construction of the sweep gas switch 48 becomes clear in particular in FIGS. 4 and 5. The sweep gas switch 48 comprises a basic body 50 which in the example shown surrounds free ends of both the inner pipe 28 and the core pipe 30. The housing lead 22 comprises a housing section 60 with an outer thread 64, onto which the housing 24 can be screwed. The housing section 60 extends coaxially to the straight portion of the inner pipe 28, which transitions into the core pipe 30.

The basic body 50 is sealed via gaskets 52 against the inner pipe 28 and the core pipe 30. In the example shown the basic body 30 extends across the entire ring chamber 40 comprising a pot-like basic shape. A floor surface 54 of the basic body 50 has through-openings 56 worked into it, through which the compressed air can be directed. On the side of the through-openings 56 facing away from the flow a rolling diaphragm 58 is arranged, which also extends across the entire ring chamber 40. The rolling diaphragm 58, on its side facing the housing section 60, is held fast via a clamping ring 62. The basic body 50 is arranged directly in front of the rolling diaphragm 58 in flow direction of the dry compressed air B.

The basic body 50 surrounds the inner pipe 28 with a valve ring guide 66. A valve ring 68 is held on this valve ring guide 66, wherein this valve ring 68 can be shifted along the longitudinal axis X-X, which extends along the core pipe 30 and the straight portion of the inner pipe 28.

Figure 4:
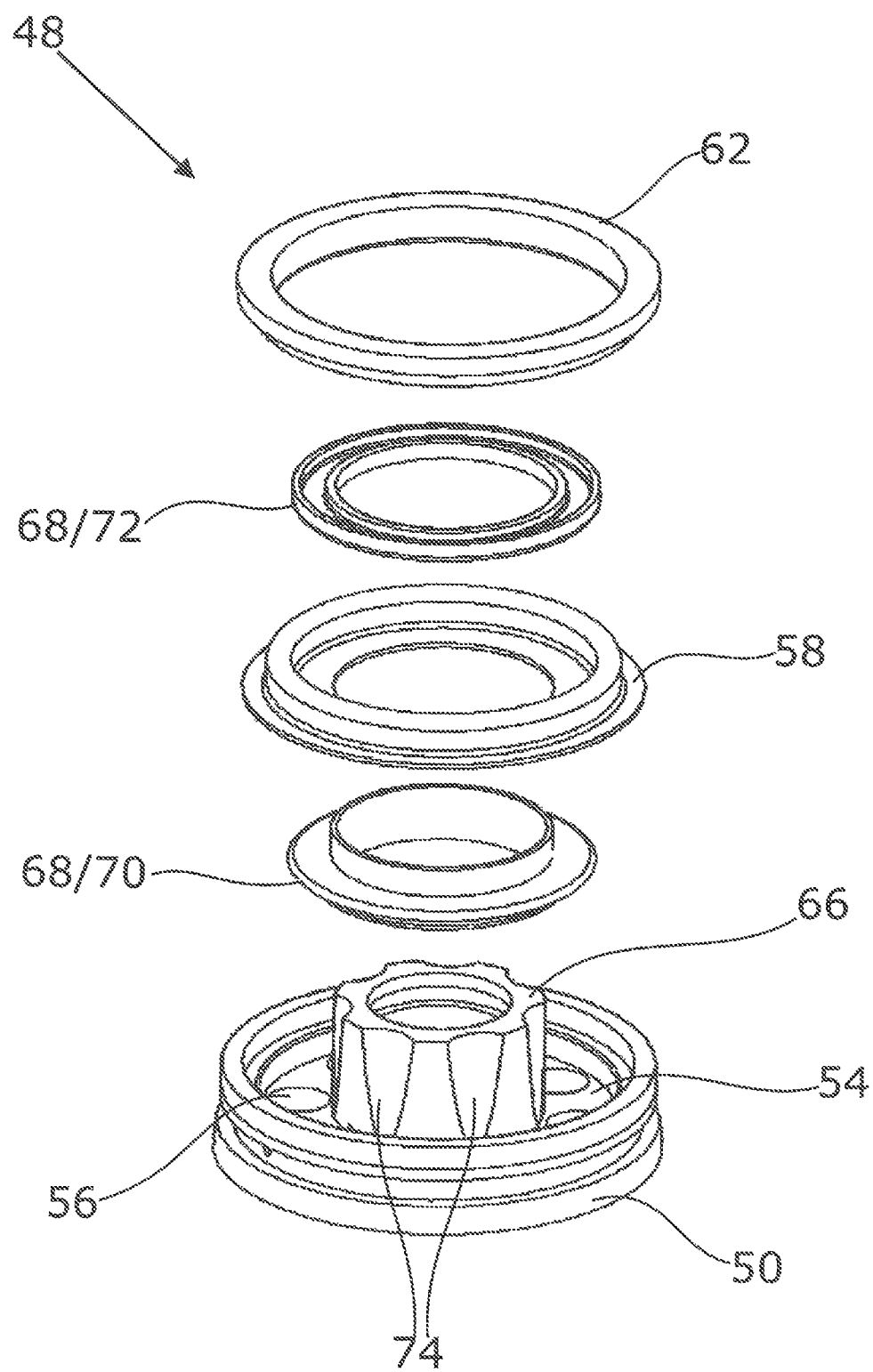
FIG. 4 shows a perspective explosive view of a sweep gas switch according to the disclosure.

The valve ring 68 is formed of a valve lower part 70 and a valve upper part 72, between which the rolling diaphragm 58 is held (see FIG. 4). This has the effect that when the rolling diaphragm 58 moves along the longitudinal axis X-X the valve ring 68 is also moved. The basic body 50 also comprises a gasket 52 on its outer side, which gasket acts as a seal against the housing section 60.

Figure 5:
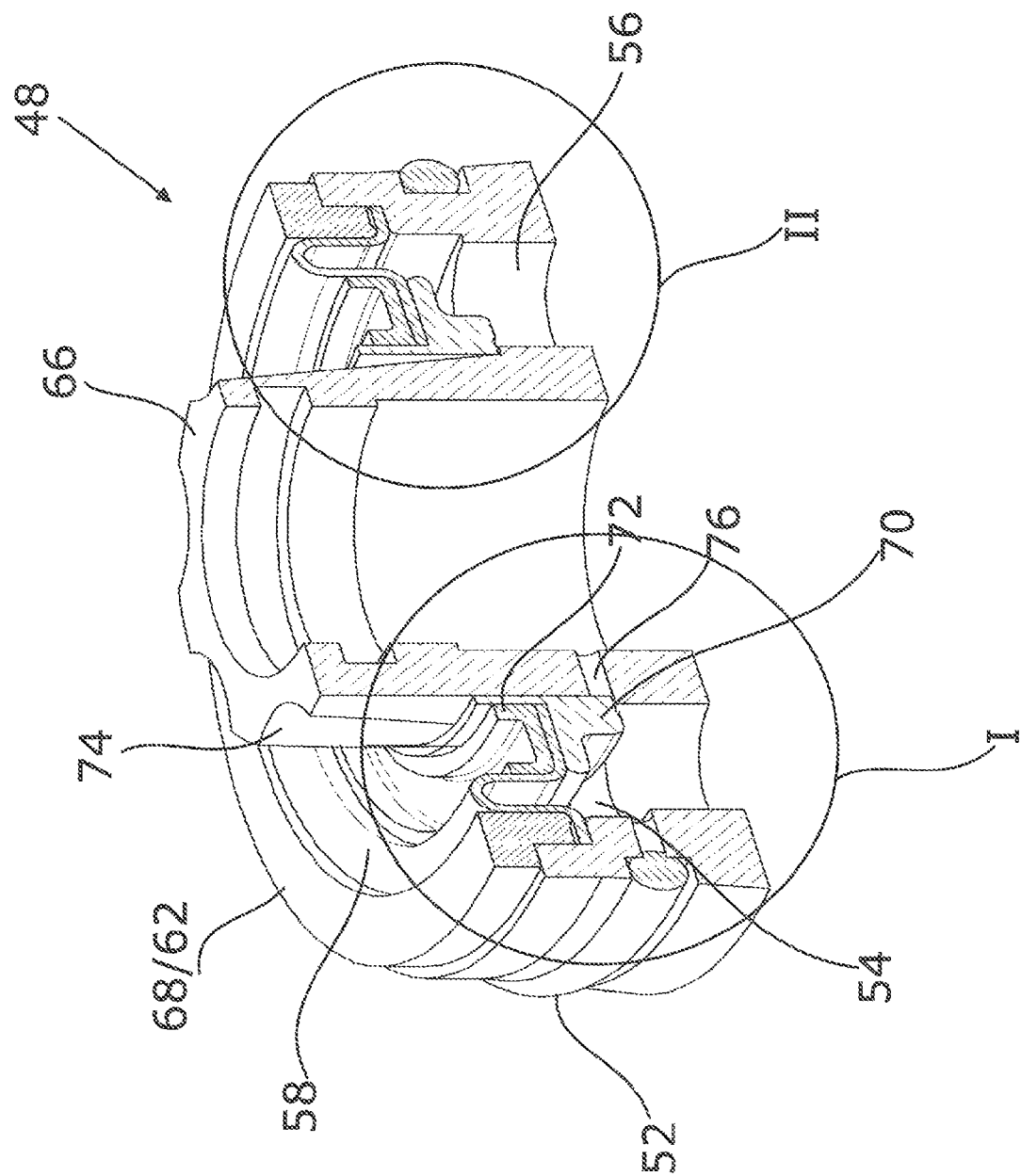
FIG. 5 shows a perspective view of the sweep gas switch of FIG. 4 in initial position, partly in cross-section.

In particular FIG. 5 makes clear that along the longitudinal axis X-X in the example shown a number of flow transfer ducts 74 are present in the valve ring guide 66, which are evenly distributed around the inner pipe 28. The flow transfer ducts 74 are formed as grooves, the depth of which increases in flow direction of the compressed air. This can be recognised in particular, on the right-hand side in FIG. 5. The progression inside the grooves is therefore conical.

FIG. 5 shows the valve ring 68 in its initial position, in which it is seated on the floor surface 54 of the basic body 50. In this position the flow transfer ducts 74 are closed so that it is not possible for dry compressed air to flow through.

FIG. 5 further shows a sweep gas duct 76, which starts in the ring chamber 40 between the floor surface 54 and the rolling diaphragm 58. Dry compressed air B is branched off through this sweep gas duct 76 and diverted in direction of the hollow fibres 36. It can be recognised that the sweep gas duct 76, in initial position of the valve ring 68, is substantially closed by the same.

Figure 6:
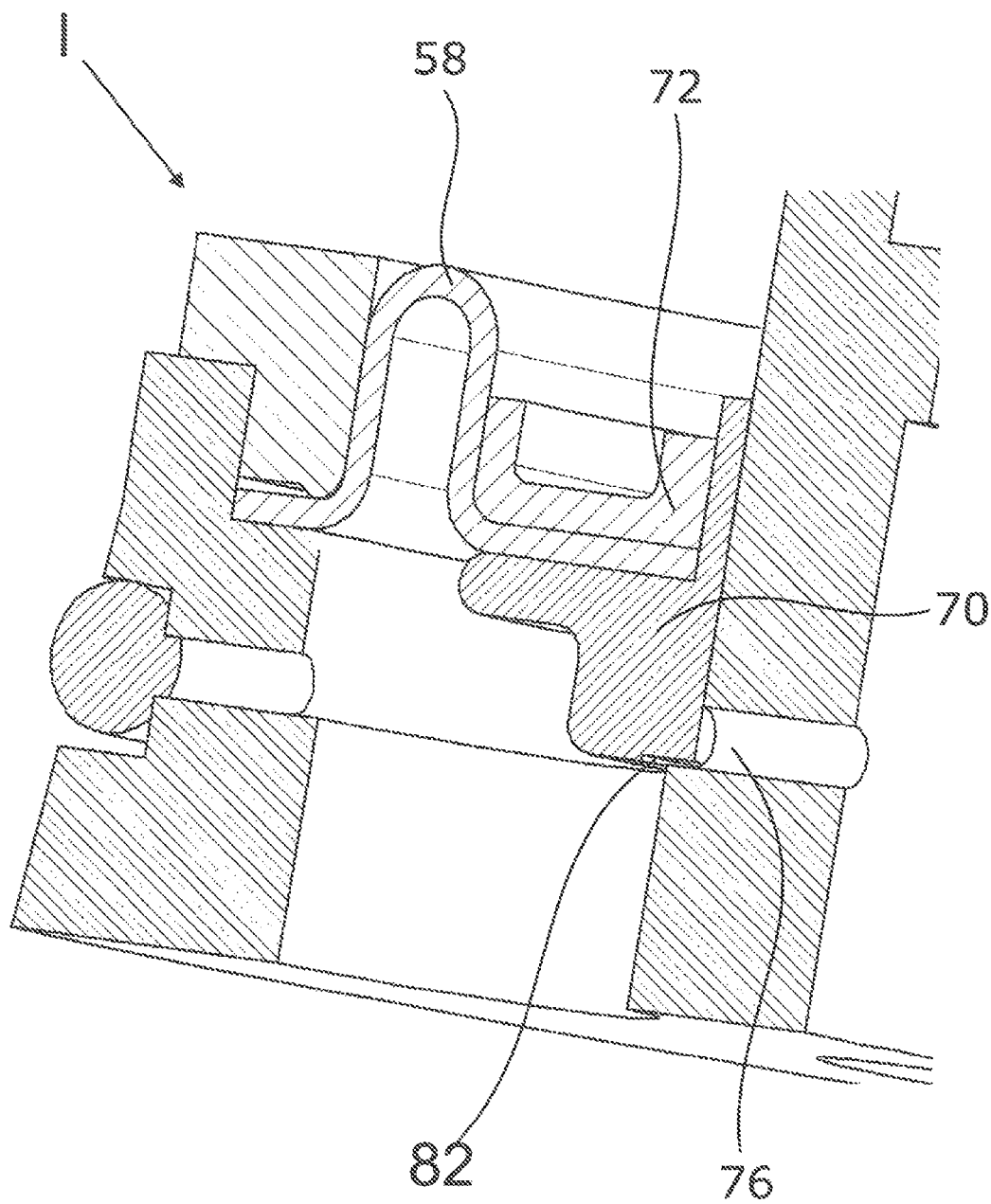
FIG. 6 shows an enlarged cut-out of area I of FIG. 5.
Figure 7:
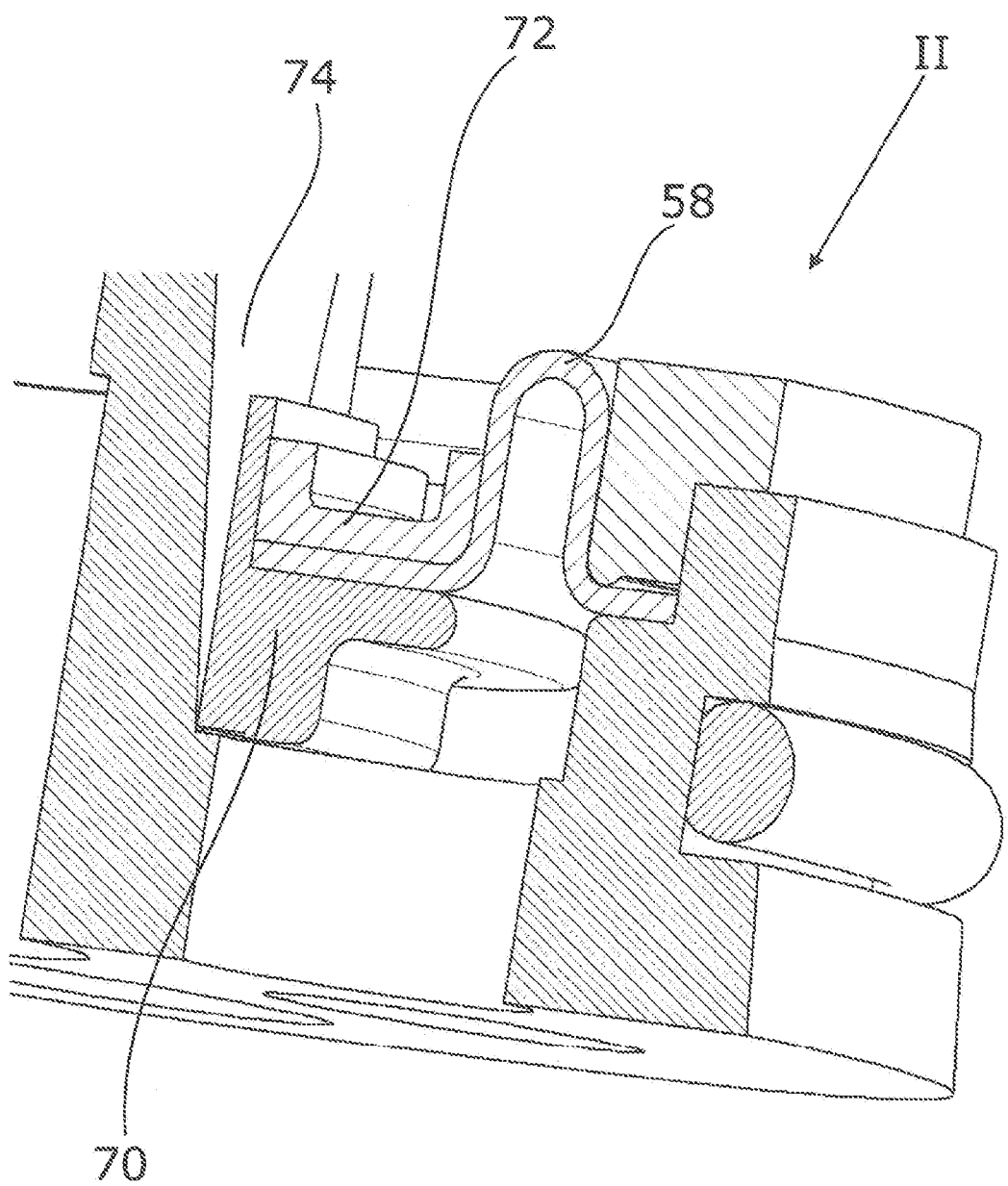
FIG. 7 shows an enlarged cut-out of section II of FIG. 5.

The initial position of the valve ring 58, the sweep gas duct 76 and one flow transfer duct 74 are shown enlarged in FIGS. 6 and 7.

The rolling diaphragm 58 comprises an inflow side 78 and an outflow side 80, wherein the inflow side 78 faces the arriving dried compressed air/the housing and the outflow side 80 faces the housing head 22/the outlet 44.

The valve ring 68, in the area of the sweep gas duct 76, comprises a through-passage 82, which is formed by a shoulder. This through-passage 82 or shoulder has the effect that even in initial position of the valve ring 68 a small portion of dry compressed air B can escape as sneak air D through the sweep gas duct 76. This sneak air D serves as control air for the entire system.

Figure 8:
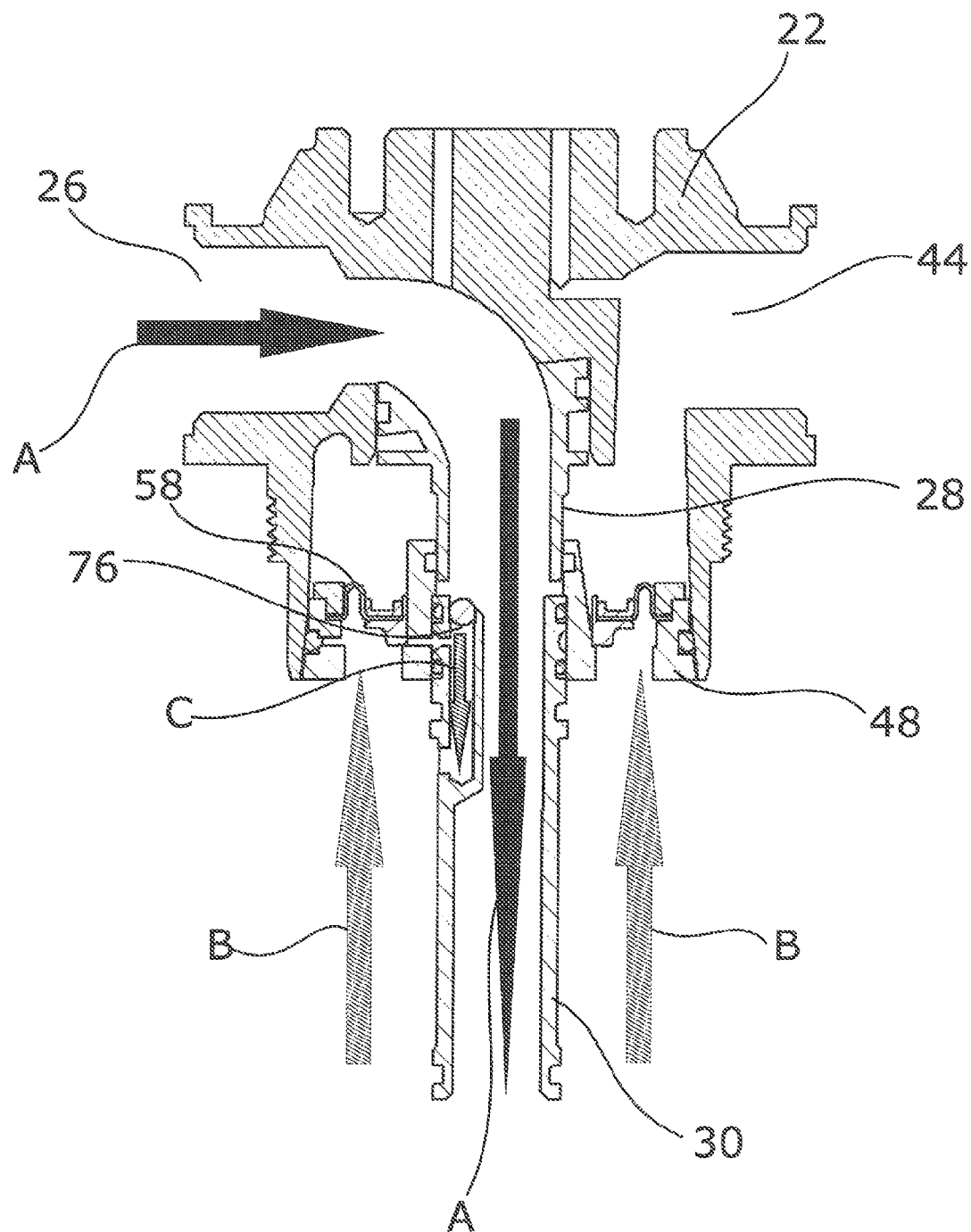
FIG. 8 shows a schematic diagram of the fluid currents through the housing head in cross-section.
Figure 9:
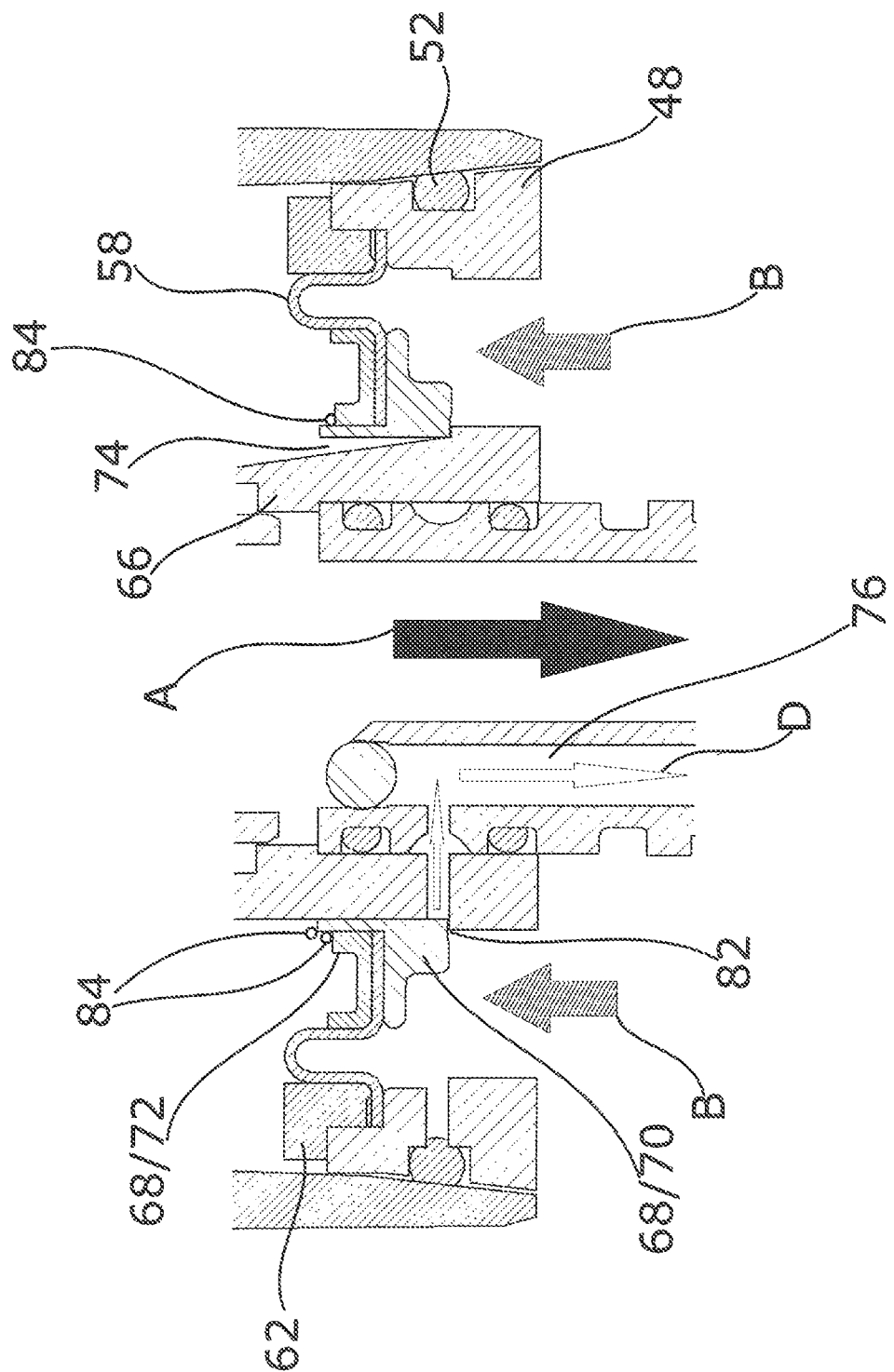
FIG. 9 shows a second schematic diagram of the fluid currents through the housing head in initial position of the valve ring.
Figure 10:
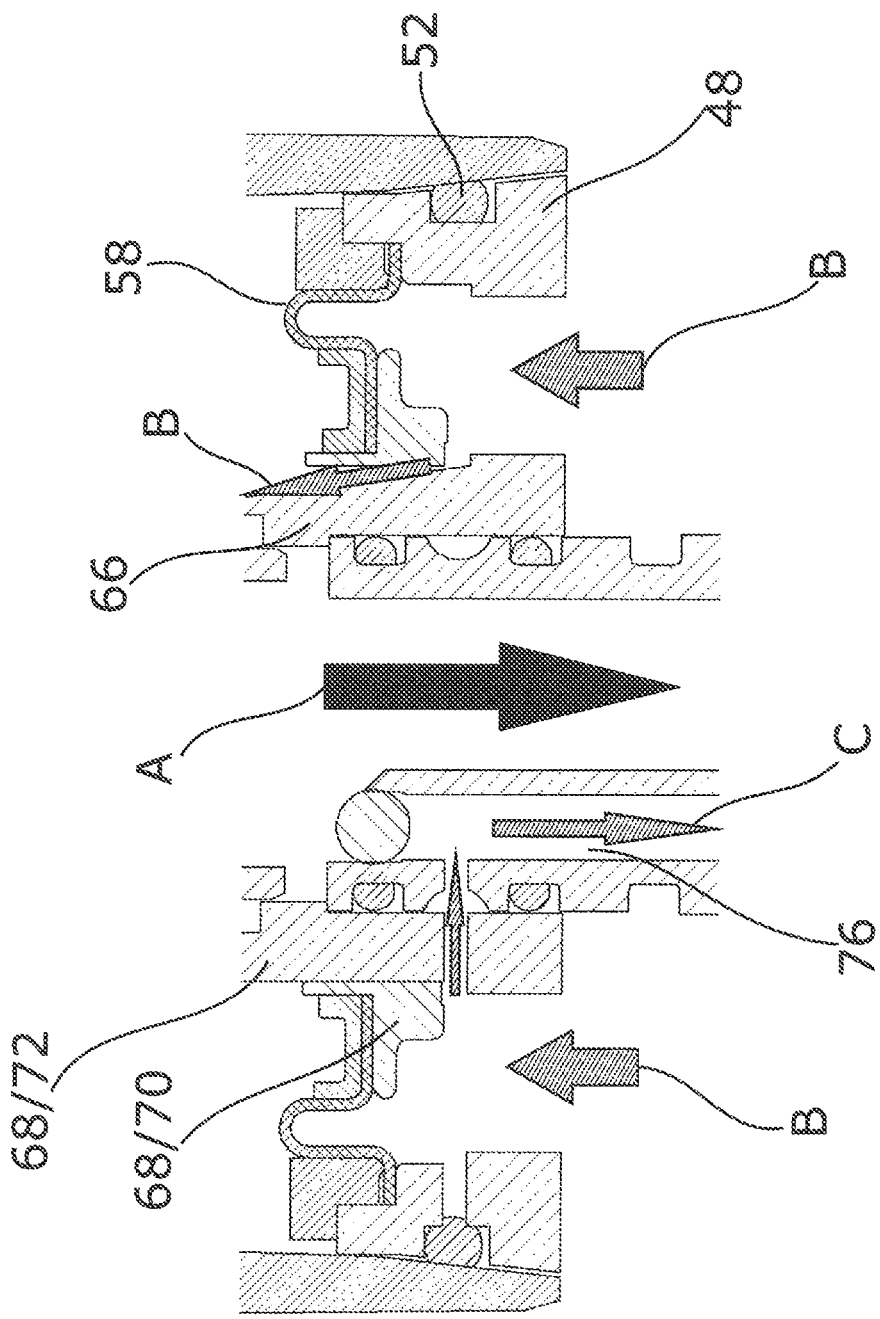
FIG. 10 shows a third schematic diagram of the fluid currents through the housing head with the valve ring lifted off the valve seat.

FIGS. 8 to 10 illustrate the flow of compressed air through the housing head 22 in the area of the sweep gas switch 48. FIGS. 8 and 9 show the valve ring 68 in its initial position. It can be recognised that compressed air is incident on the inflow side 78 of the rolling diaphragm 58. Since no compressed air is drawn, the valve ring 68 remains in its initial position and closes both the flow transfer ducts 74 and the sweep gas duct 76. FIG. 9 also shows that merely a small portion of compressed air is directed away as sneak air D through the through-passage 82. The sweep gas duct 76 comprises a first section which essentially extends transversely to the longitudinal axis X-X, a second section which extends in parallel to the longitudinal axis X-X and a third section which extends again transversely to the longitudinal axis X-X. The sweep gas duct 76 thus diverts the sweep gas C and the sneak air D and directs it against the principal flow direction within the housing 24 back into the housing annular space 34 into the area between the holding elements 38 of the hollow fibres 36. There the dry compressed air B flows on the outside between the hollow fibres 36 to the sweep gas outlet 46.

Furthermore a spring element 84 is indicated in FIG. 9, which holds the valve ring 68 in its initial position. It is not until pressure generated by the compressed air exceeds the elastic force of the spring element 68 that the valve ring 68 lifts off the floor surface 54.

Figure 11:
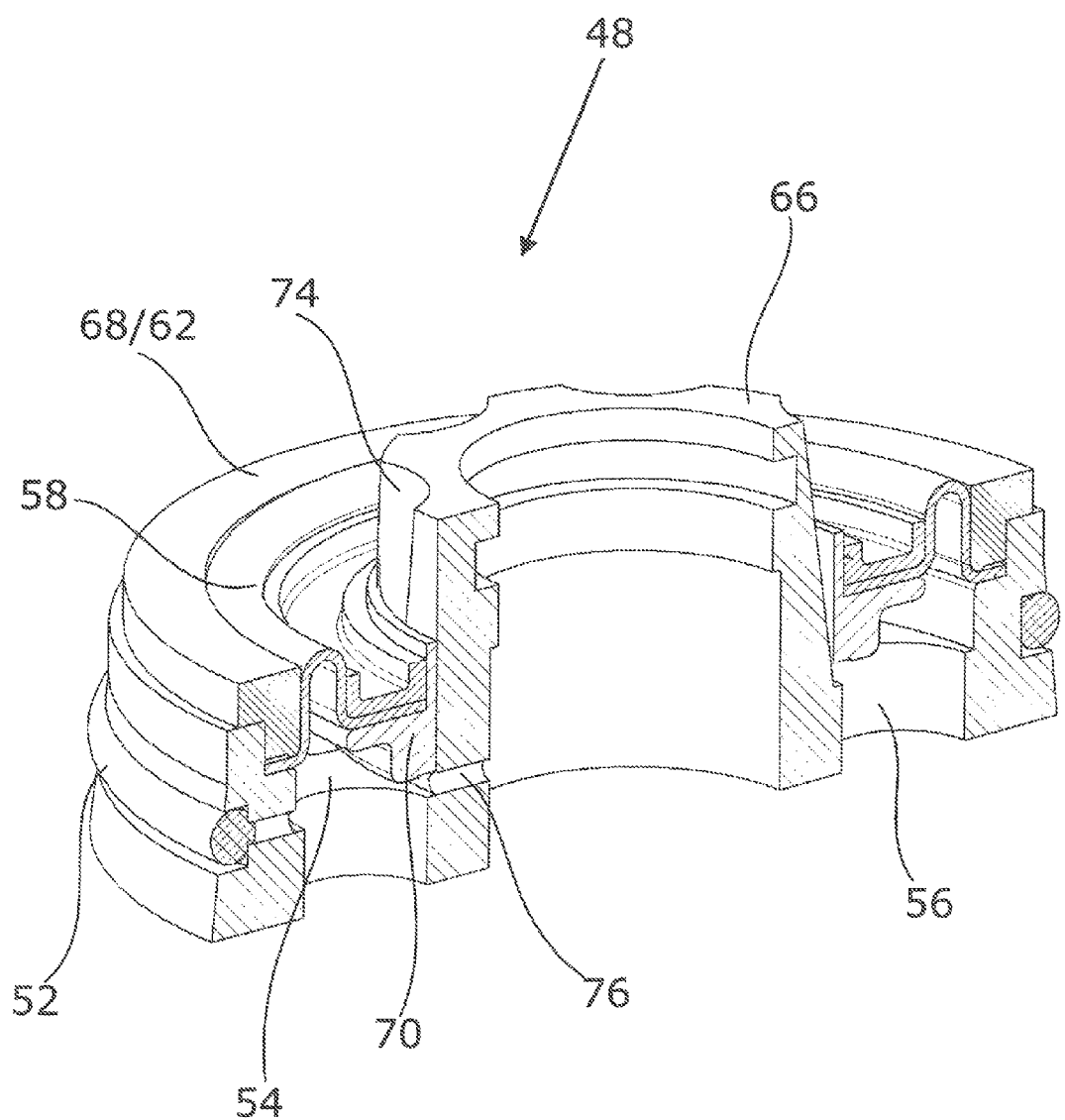
FIG. 11 shows the sweep gas switch in cross-section with the valve ring lifted off.

FIGS. 10 and 11 show the valve ring 68 in lifted-off position, in which it does not touch the floor surface 54. It can be clearly recognised that the sweep gas duct 76 and the flow transfer ducts 74 are open. In particular FIG. 10 illustrates the function of the deepening groove/the continuous widening of the flow transfer ducts 74 in flow direction. The larger the distance of the valve ring 68 from the floor surface 54, the larger becomes the diameter of the free opening for the compressed air.

The disclosure is not limited to the embodiment shown, but merely represents a first variant of the disclosure. For example, the flow transfer ducts 74 could also be arranged in the valve ring 68. It is also feasible that the valve ring 68 with the rolling diaphragm 58 lifts off in the outer area and is immovably held on the inner pipe 28.

The invention claimed is:

1. A housing head for a drying apparatus for compressed air can be connected to a housing, in which a diaphragm filter is arranged having:
   a) an inlet for humid compressed air , the inlet transitions into an inner pipe, which at least in sections, is surrounded coaxially by a housing section, and
   b) an outlet for dried compressed air, the outlet transitions into a ring-shaped chamber which is formed between an outer side of the inner pipe and an inner side of the housing section,
   wherein
      a valve ring guide of a main body surrounds the inner pipe and is held immovably thereon,
      a ring-shaped rolling diaphragm is arranged in the ring-shaped chamber, the rolling diaphragm is held at the outer side thereof and is connected at the inner side thereof to a valve ring which surrounds the valve ring guide of the main body and which is movable along a longitudinal axis (X-X) of the valve ring guide,
      at least one flow transfer duct is arranged between the valve ring and the valve ring guide, the flow transfer duct runs past the rolling diaphragm in flow direction of the compressed air and is closed off by the valve ring when the valve ring is in its initial position in which there is substantially no demand for compressed air,
      the valve ring guide has a sweep gas duct through which dry compressed air can be conducted back in the direction of the diaphragm filter and the sweep gas duct is substantially closed off by the valve ring when the valve ring is in its initial position.

2. The housing head according to claim 1, wherein the valve ring, in the area where it rests against the sweep gas duct, has a through-passage, through which permanently dry sneak air is directed into the sweep gas duct.

3. The housing head according to claim 1, wherein the main body, in flow direction of the dry compressed air, extends directly from the rolling diaphragm across the entire ring-shaped chamber and has a pot-like basic shape, wherein through-openings are worked into a floor surface of the main body.

4. The housing head according to claim 1, wherein the at least one flow transfer duct is formed by a groove in the valve ring guide.

5. The housing head according to claim 4, wherein the depth of the groove increases in flow direction of the dry compressed air.

6. The housing head according to claim 1, further including a number of flow transfer ducts evenly distributed around the inner pipe in the valve ring guide.

7. The housing head according to claim 1, wherein the sweep gas duct has a first section essentially extending transversely to the longitudinal axis of the valve ring guide, a second section extending in parallel to the longitudinal axis of the valve ring guide and a third section again extending transversely to the longitudinal axis and ending in the housing annular space between holding elements of the hollow fibres.

8. The housing head according to claim 1, further including a spring element, which holds the valve ring in its original position, when there is no demand for dry compressed air.

9. The housing head according to claim 8, wherein the spring element is formed by a screw spring arranged between the valve ring and a support surface inside the housing head.

\* \* \* \* \*